United States Patent
Kuo et al.

(10) Patent No.: US 7,060,745 B2
(45) Date of Patent: Jun. 13, 2006

(54) WATERBORNE ACRYLATE-FUNCTIONALIZED ALKYD COATING COMPOSITIONS

(75) Inventors: Thauming Kuo, Kingsport, TN (US); Paul Vincent Grosso, Algonquin, IL (US); Gary Eugene Spilman, Lake in the Hills, IL (US); Mark Dwight Clark, Kingsport, TN (US)

(73) Assignee: Resolution Specialty Materials LLC, Houston, TX (US)

( * ) Notice: Subject to any disclaimer, the term of this patent is extended or adjusted under 35 U.S.C. 154(b) by 177 days.

(21) Appl. No.: 10/121,396

(22) Filed: Apr. 12, 2002

(65) Prior Publication Data

US 2003/0195292 A1    Oct. 16, 2003

(51) Int. Cl.
*C08K 3/10* (2006.01)
*C08K 3/18* (2006.01)
*C08K 3/22* (2006.01)

(52) U.S. Cl. ............ 524/413; 524/433; 524/455
(58) Field of Classification Search ............ 524/413, 524/433, 455
See application file for complete search history.

(56) References Cited

U.S. PATENT DOCUMENTS

| | | |
|---|---|---|
| 3,196,119 A | 7/1965 | Boller et al. |
| 3,641,201 A | 2/1972 | Hellman |
| 3,734,874 A | 5/1973 | Kibler et al. |
| 3,932,562 A | 1/1976 | Takahashi |
| 4,018,332 A | 4/1977 | Anderson et al. |
| 4,102,944 A | 7/1978 | Fukuyama et al. |
| 4,113,702 A | 9/1978 | Psencik |
| 4,116,903 A | 9/1978 | Lietz et al. |
| 4,131,579 A | 12/1978 | Mummenthey et al. |
| 4,234,466 A | 11/1980 | Takahashi et al. |
| 4,235,466 A | 11/1980 | Mandrik |
| 4,474,941 A | 10/1984 | Wilk et al. |
| 4,517,322 A | 5/1985 | Birkmeyer et al. |
| 4,571,420 A | 2/1986 | Marks |
| 4,690,980 A | 9/1987 | Singer et al. |
| 4,719,254 A | 1/1988 | Levine |
| 4,973,656 A | 11/1990 | Blount |
| 4,983,716 A | 1/1991 | Rao et al. |
| 5,218,042 A | 6/1993 | Kuo et al. |
| 5,288,804 A | 2/1994 | Kim et al. |
| 5,340,871 A | 8/1994 | Pearson et al. |
| 5,349,026 A | 9/1994 | Emmons et al. |
| 5,371,148 A | 12/1994 | Taylor et al. |
| 5,378,757 A | 1/1995 | Blount, Jr. et al. |
| 5,484,849 A | 1/1996 | Bors et al. |
| 5,498,659 A | 3/1996 | Esser |
| 5,530,059 A | 6/1996 | Blount, Jr. et al. |
| 6,051,633 A | 4/2000 | Tomko et al. |
| 6,262,149 B1 | 7/2001 | Clark et al. |
| 6,323,254 B1 | 11/2001 | Weikard et al. |
| 6,344,503 B1 | 2/2002 | Nkansah et al. |
| 6,476,183 B1 | 11/2002 | Bakkeren et al. |
| 6,548,601 B1 | 4/2003 | Kuo et al. |

FOREIGN PATENT DOCUMENTS

| | | |
|---|---|---|
| EP | 0 351 024 A2 | 1/1990 |
| EP | 1002842 A1 | 5/2000 |
| EP | 1 149 874 A | 10/2001 |
| JP | 48085628 | 11/1973 |
| WO | WO 99/07759 A1 | 2/1999 |
| WO | WO 00/73392 A3 | 12/2000 |
| WO | WO 01/00741 A1 | 1/2001 |

OTHER PUBLICATIONS

Oldring et al, Resins for Surface Coatings, 1987, vol. 1, p. 127.
Oldring et al, Resins for Surface Coatings, 1987, vol. 1, p. 181.
Calbo, Handbook of Coatings Additives, 1987, pp. 496–506.
Witzeman, et al, Journal of Coatings Technology, 1990, vol. 62, No. 789, pp. 101–112.
F. Del Rector et al., Journal of Coatings Technology, pp. 31–37, vol. 61, No. 771, Apr. 1989.

*Primary Examiner*—Kriellion A. Sanders
(74) *Attorney, Agent, or Firm*—Lisa Kimes Jones

(57) ABSTRACT

A waterborne acrylate-functionalized alkyd coating composition is disclosed, which includes an acrylate-functionalized alkyd resin, at least one drier, and water. The acrylate-functionalized alkyd resin comprises the reaction product of (i) a hydroxy functional alkyd resin, (ii) an acid anhydride, and (iii) a glycidyl acrylate. Methods of preparing waterborne acrylate-functionalized alkyd coating compositions are also disclosed.

21 Claims, No Drawings

WATERBORNE ACRYLATE-FUNCTIONALIZED ALKYD COATING COMPOSITIONS

FIELD OF INVENTION

The invention relates to waterborne coating compositions, and more particularly, to waterborne coating compositions having acrylate-functionalized alkyd resins.

BACKGROUND OF THE INVENTION

In recent years, considerable efforts have been made by the coatings industry to develop coating formulations containing little or no volatile organic compound (VOC) content. Regulations to limit the amount of VOC content of industrial coatings have encouraged research and development to explore new technologies directed at reducing solvent emissions from industrial solvent-based coatings operations used to coat such products as automotive parts, appliances, general metal products, furniture, and the like. However, while the move to reduced organic solvent-based compositions brings health and safety benefits, these lower VOC content coating compositions must still meet or exceed the performance standards expected from solvent-based compositions.

Alkyd resins are one of the most common binders used for ambient-cure, solvent-based coatings. The resistance properties of traditional solvent-borne alkyd resins are developed via autooxidative crosslinking of the alkyd film. Crosslinking occurs when the activated methylene groups in the unsaturated fatty acids or oils of the alkyd are oxidized in air to give hydroperoxides which subsequently decompose to generate free radicals, resulting in oxidative crosslinking. This oxidative crosslinking process is commonly accelerated by adding driers, such as, for example, various salts of cobalt, zirconium, calcium, and manganese. However, while alkyd resins have shown, and continue to show, promise, they have relatively slow "dry" and/or cure times, particularly at ambient temperatures. Various modifications have been made to alkyd resins to address such concerns.

One such attempt includes polymerization of an alkyd resin with a vinyl compound, such as styrene or methyl methacrylate, via a free-radical reaction, to produce a vinyl-alkyd copolymer or a vinyl alkyd. Vinyl alkyd resins generally have a higher molecular weight and a higher $T_g$, producing coatings with reduced tack-free time (solvent evaporation). However, the through-dry time (oxidation of the film) of such coatings is longer due to the decreased degree of unsaturation in the alkyd as a result of copolymerization with the vinyl compound. This problem is described in further detail in *Resins for Surface Coatings*, Vol. 1, pp. 181 et seq., ed. by P. K. T. Oldring and G. Hayward, SITA Technology, London, UK, 1987, which is incorporated herein by reference. An additional drawback is that paint formulations containing vinyl alkyd resins require greater amounts of solvent, due to the increased molecular weight and $T_g$ of the vinyl alkyd.

JP 48085628 (hereinafter JP '628) describes light-curable coating compositions made from a drying oil-modified alkyd resin which is further modified using glycidyl acrylate, glycidyl methacrylate, or its derivative. In this reference, drying oil-modified alkyd resins having —$CO_2H$ groups and an oil length of 20–80 are treated with glycidyl acrylate, glycidyl methacrylate, or its derivative, in the presence of a polymerization inhibitor. In a specific embodiment, a drying oil-modified alkyd resin having an acid number of 100 and an oil length of 34 is reacted with 36 parts glycidyl methacrylate, to give a resin varnish having an acid number of 5.0.

Both the acid number of the drying oil-modified alkyd resin of JP '628, and the amount of glycidyl methacrylate used, are relatively high, requiring the use in the reaction mixture of hydroquinone, a polymerization inhibitor, to prevent the alkyd from gelling during resin synthesis. One drawback of this approach is that the presence of a polymerization inhibitor in paint formulations is known to prolong the drying times of the resulting coating films. Moreover, the disclosed alkyd resin composition of JP '628 contains an amine monomer, triethanolamine, which is desirable for the UV cure application intended, but can cause detrimental effects on oxidative cure. The resin in JP '628 is afterward mixed with a photosensitizer or a photoinitiator to give a coating composition which hardens with UV irradiation. Accordingly, the disclosed coating composition requires the use of a photosensitizer or photoinitiator, and UV irradiation, in order to carry out the teaching. The reference does not teach a coating composition suitable for ambient oxidative cure, high-solids coating applications.

Thus there still exists a need in the art for a modified or functionalized alkyd resin capable of undergoing crosslinking upon film formation, which can be used to prepare ambient oxidative cure, fast-dry, and high solids coatings, having low VOC content. Such coatings would ideally exhibit the properties and advantages of high VOC content coatings.

SUMMARY OF THE INVENTION

The invention is a waterborne acrylate-functionalized alkyd coating composition comprising an acrylate-functionalized alkyd resin, at least one drier, and water. The acrylate-functionalized alkyd resin comprises the reaction product of (a) an alkyd resin, (b) an acid anhydride, and (c) a glycidyl acrylate. The glycidyl moiety of the glycidyl acrylate is the reactive moiety to functionalize the alkyd resin. The reaction product contains pendant reactive acrylate moieties.

The invention also relates to a method of preparing a waterborne acrylate-functionalized alkyd coating composition comprising the step of contacting an acrylate-functionalized alkyd resin with at least one drier in the presence of water.

DETAILED DESCRIPTION OF THE INVENTION

The invention provides a waterborne acrylate-functionalized alkyd coating composition comprising an acrylate-functionalized alkyd resin, at least one drier, and water. The acrylate-functionalized alkyd resin comprises the reaction product of (a) an alkyd resin, (b) an acid anhydride, and (c) a glycidyl acrylate. The glycidyl moiety of the glycidyl acrylate is the reactive moiety to functionalize the alkyd resin. The reaction product contains pendant reactive acrylate moieties.

In a preferred embodiment of the invention, a waterborne acrylate-functionalized alkyd coating composition contains from about 30 to about 60 wt %, based on the total weight of the composition, of an acrylate-functionalized alkyd resin, from about 40 to about 70 wt %, based on the total weight of the composition, of water, from 0 to about 30 wt %, based on the total weight of the composition, of an organic solvent, and from about 0.01–1.0 wt %, based on the total weight of the composition, of at least one drier. According to the invention, a waterborne acrylate-functionalized alkyd coating composition exhibits improved tack-free and through-dry times, and may be used in waterborne compositions having reduced VOC.

Such an acrylate-functionalized alkyd resin exhibits superior tack-free time and through-dry time properties.

Furthermore, an acrylate-functionalized alkyd resin of the invention exhibits superior tack-free time properties, which previously could only be improved by increasing the molecular weight and $T_g$ of the alkyd resin. Since the amount of VOC generally added to alkyd resin compositions and/or formulations is directly related to the molecular weight and $T_g$ of the alkyd resin, compositions or formulations containing an acrylate-functionalized alkyd resin of the invention would require less VOC content.

In a preferred embodiment of the invention, the acrylate-functionalized alkyd resin comprises the reaction product of: (a) from about 79 to about 95 wt % of an alkyd resin, (b) from about 2 to about 8 wt % of an acid anhydride, and (c) from about 3 to about 13 wt % of a glycidyl acrylate, each as described herein, wherein the weight percents are based on the total weight of (a), (b) and (c).

Any alkyd resin may be used as an alkyd resin in a coating composition of the invention. An alkyd is typically prepared by reacting a diol, a polyol, a polyacid, a monofunctional acid, and a fatty acid, fatty ester, or naturally occurring, partially-saponified oil, optionally in the presence of a catalyst. More specifically, an alkyd resin may be the reaction product of: (i) from 0 to about 30 mol % of a diol, (ii) from about 10 to about 40 mol % of a polyol, (iii) from about 20 to about 40 mol % of a polyacid, (iv) from 0 to about 10 mol % of a monofunctional acid, (v) from about 10 to about 50 mol % of a fatty acid, fatty ester or naturally occurring oil, and optionally (vi) a catalyst, wherein the mole percents are based on the total moles of (i), (ii), (iii), (iv), (v), and (vi), if present. Suitable examples of each of the components of the alkyd resin include those known in the art, including, but not limited to, those discussed below, and in *Resins for Surface Coatings*, Vol. 1, p. 127, ed. by P. K. T. Oldring and G. Hayward, SITA Technology, London, UK, 1987, incorporated herein by reference.

The fatty acid, fatty ester, or naturally occurring, partially-saponified oil may be any fatty acid, fatty ester, or naturally occurring-partially saponified oil known in the art used in the formation of an alkyd resin. In a preferred embodiment, at least one monobasic fatty acid, fatty ester, or naturally occurring, partially-saponified oil is used and selected from the following formulae (I), (II) and (III):

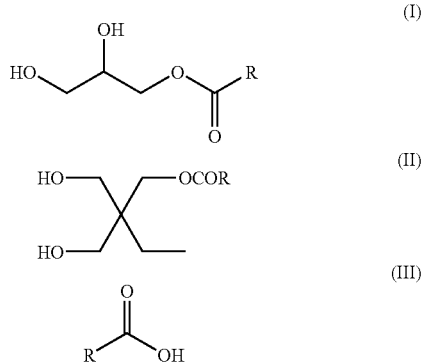

In formulae (I), (II) and (III), R is a saturated or unsaturated $C_8$–$C_{20}$ alkyl group. More preferably, R is one of the following unsaturated $C_{17}$ alkyl groups:

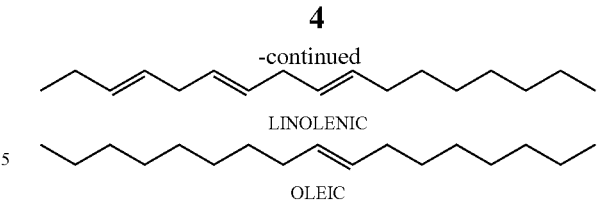

In another embodiment, the monobasic fatty acid or fatty ester oil may be prepared by reacting an oil or a fatty acid with a polyol. Examples of suitable oils include sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids, alone or as components of oil, include, but are not limited to, tallow acid, soya acid, myristic acid, linseed acid, crotonic acid, versatic acid, coconut acid, tall oil fatty acid (e.g., PAMOLYN 200, commercially available from Eastman Chemical Co.), rosin acid, neodecanoic acid, neopentanoic acid, isostearic acid, 12-hydroxystearic acid, cottonseed acid, and the like.

The polyol used in the preparation of the alkyd resin itself, or the monobasic fatty acid or fatty ester, is preferably selected from aliphatic, alicyclic, and aryl alkyl polyols. Suitable examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythritol (PE).

In addition to the polyol, a diol may be used in the preparation of the alkyd resin. Examples of suitable diols include, but are not limited to, neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, and hydrogenated bisphenol A. Preferably, the diol is neopentyl glycol (NPG).

The polyacid (dicarboxylic acid or tricarboxylic acid) and monofunctional acid (monocarboxylic acid) components of the alkyd resin may be any polyacid or monofunctional acid known in the art used in the formation of an alkyd resin. The dicarboxylic acid may be, for example, isophthalic acid, phthalic anhydride(acid), terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, hexahydrophthalic anhydride, tetrahydrophthalic anhydride, maleic anhydride, fumaric acid, succinic anhydride, succinic acid, 2,6-naphthalenedicarboxylic acid or glutaric acid and the like. Preferably, the dicarboxylic acid is isophthalic acid, phthalic anhydride, or phthalic acid. The tricarboxylic acid may be, for example, trimellitic anhydride. A monofunctional acid may also be used, such as, for example, benzoic acid, acetic acid, propionic acid, t-butylbenzoic acid, and butanoic acid.

Optionally, a catalyst may be used to promote the formation of an alkyd resin. The catalyst may be any catalyst known in the art used in the formation of an alkyd resin. Preferably, the catalyst is an acid catalyst, such as, for example, FASCAT 4100. The amount of catalyst added promotes the formation of an alkyd resin, as described above, and may be determined by routine experimentation as understood by those skilled in the art. Preferably, a catalyst is added in amounts ranging from about 0.01–1.00 wt % based on the amount of reactants.

An alkyd resin may be prepared at a temperature range of about 170–230° C., more preferably at about 180–220° C., and most preferably at about 190–210° C. In a preferred embodiment of the invention, an alkyd resin has a hydroxyl number of from about 30 to about 180 mg KOH/g, an acid number of from 0 to about 100 mg KOH/g, and a number average molecular weight of from about 700 to about 4000.

In another embodiment of the invention, the alkyd resin further comprises 2 to 10 mol % of a sulfomonomer. The difunctional sulfomonomer is utilized to promote water dispersibility, and may be a diacid or derivative thereof, containing an —SO$_3$M group. Suitable difunctional sulfomonomers are described in U.S. Pat. Nos. 4,973,656, 5,218,042, and 5,378,757. The metal ion of the sulfonate salt group may be Na$^+$, Li$^+$, K$^+$, Mg$^{2+}$, Ca$^{2+}$, Cu$^{2+}$, Fe$^{2+}$, or Fe$^{3+}$. Preferably, the metal ion is a monovalent cation.

The —SO$_3$M group may be attached to an aromatic nucleus, examples of which include, but are not limited to, benzene, naphthalene, anthracene, diphenyl, oxydiphenyl, sulfonyidiphenyl, and methylenediphenyl. For example, the difunctional monomer may be a sodium salt of a sulfoterephthalic acid, 5-sulfoisophthalic acid, sulfophthalic acid, 4-sulfonaphthalene-2,7-dicarboxylic acid, dimethyl 5-sulfoisophthalic acid, or a derivative of such acids. Preferably, the difunctional sulfomonomer is 5-(sodiosulfo)-isophthalic acid, 5-(lithiosulfo)-isophthalic acid, or methyl esters thereof. The most preferred difunctional sulfomonomer is 5-(sodiosulfo)-isophthalic acid (SIP).

The SIP-containing alkyd may be prepared by pre-reacting NPG and SIP, at a temperature range of about 150–190° C., followed by the reaction with other reactants. The preferred acid number of the SIP-containing alkyd resin is from about 3 to about 50 mg KOH/g.

To enhance water dispersibility, another embodiment of the coating composition further comprises an amine. The amine is added to neutralize the carboxyl groups in an acrylate-functionalized alkyd resin to yield ammonium salts, which are water dispersible. The amine is present in an amount sufficient to neutralize 70–100% of the carboxyl groups in the acrylate-functionalized alkyd resin. The preferred acid number of the acrylate-functionalized alkyd resin before neutralization is about 40 to about 70 mg KOH/g. Typical amines include, but are not limited to, ammonia, trimethylamine, triethylamine, diethylamine, monoethanolamine, monoisopropanolamine, morpholine, ethanolamine, diethanolamine, N,N-dimethylethanolamine, N,N-diethylethanolamine, and N-methyldiethanolamine.

When an acrylate-functionalized alkyd resin has a low acid number, such as from 0 to about 30, a surfactant may be added to effect the successful emulsification of the alkyd resin in water, with or without an amine. The surfactant may also enhance water dispersibility. Suitable surfactants for alkyd emulsification may be anionic, cationic, or nonionic surfactants. Examples of anionic surfactants include alkali metal or ammonium salts of fatty acids; alkyl, aryl, or alkylaryl sulfonates, sulfates, and phosphates; and mixtures thereof. Examples of nonionic surfactants include alkyl and alkylarylpolydiol ethers, such as ethoxylation products of lauryl, oleyl and stearyl alcohols, and alkylphenol glycol ethers such as ethoxylation products of octylphenol or nonylphenol.

An acrylate-functionalized alkyd resin may be prepared by first reacting an alkyd resin with an acid anhydride to produce a carboxyl-functional alkyd resin, and reacting the carboxyl-functional alkyd resin with a glycidyl acrylate, to produce an acrylate-functionalized alkyd resin, as described above. An acrylate-functionalized alkyd resin may be prepared at a temperature range of about 100–170° C., or at about 115–165° C., or at about 125–155° C.

In another embodiment of the invention, an acrylate-functionalized alkyd resin is prepared by reacting: (i) from 0 to about 30 mol % of a diol, (ii) from about 10 to about 40 mol % of a polyol, (iii) from about 20 to about 40 mol % of a polyacid, (iv) from 0 to about 10 mol % of a monofunctional acid, and (v) from about 10 to about 50 mol % of a fatty acid, a fatty ester, or a naturally occurring, partially-saponified oil, in the presence of (vi) a catalyst, each as described above, at about 180–250° C., until the desired amount of the condensate is obtained to form (a) an alkyd resin, wherein the mole percents are based on the total moles of (i), (ii), (iii), (iv), (v) and (vi); reacting the alkyd resin (a) with from about 2 to about 8 wt % of (b) an acid anhydride at about 150–165° C. for about 2–6 hours, until a clear reaction mixture is obtained, to thereby form a carboxyl-functional alkyd resin, each as described above. The carboxyl-functional alkyd resin is then reacted with from about 3 to about 12 wt % of (c) glycidyl acrylate, at about 125–155° C., until an acid number of less than about 5 is obtained, to thereby form the desired acrylate-functionalized alkyd resin, each as described above, wherein the weight percents are based on the total weight of (a), (b), and (c).

Suitable acid anhydrides include those known in the art. Examples of suitable acid anhydrides include, but are not limited to, trimellitic anhydride, phthalic anhydride, maleic anhydride, and fumaric anhydride. Preferably, trimellitic anhydride or phthalic anhydride is used.

The glycidyl acrylate may be any substituted or unsubstituted acrylate containing an epoxide or glycidyl moiety that, upon reaction with an alkyd resin and an acid anhydride, will produce an acrylate-functionalized alkyd resin capable of effecting crosslinking during the curing process, each as described above. According to the invention, upon reaction with an alkyd resin and an acid anhydride, the glycidyl moiety of the glycidyl acrylate exhibits greater reactivity than the acrylate moiety, i.e., it is the glycidyl moiety which undergoes reaction with the reactive product of the alkyd resin and acid anhydride. Suitable substituents for the acrylate portion of the glycidyl acrylate include $C_1$–$C_{18}$ alkyl groups to form classes of compounds, such as, for example, alkylacrylates (e.g., methacrylates) and crotonates. Preferably, the glycidyl acrylate is glycidyl methacrylate.

The drier of an ambient cure composition of the invention may be any drier known in the art. Examples of suitable driers include, but are not limited to, various salts of cobalt, zirconium, calcium, zinc, lead, iron, cerium, aluminium, and manganese. Preferably, the drier is a cobalt drier. Mixtures of driers (i.e. a drier system) may also be used. The driers typically are used as octoates or naphthenates, in an amount of from 0.005–0.5 wt. % metal, based on the alkyd resin. Examples of commercial products are Zirconium HEX-CEM, Cobalt TEN-CEM, Calcium CEM-ALL, Zirconium HYDRO-CEM, and Cobalt HYDRO-CURE II sold by OMG Americas of Westlake, Ohio. A description of metal driers, their functions, and methods for using them may be found in *Handbook of Coatings Additives*, p. 496–506, ed. by L. J. Calbo, Marcel Dekker, INC. New York, N.Y., 1987, which is incorporated by reference herein in its entirety.

In a preferred embodiment of the invention, a waterborne acrylate-functionalized alkyd coating composition, as described above, may also contain at least one pigment to form an acrylate-functionalized alkyd coating enamel composition. Preferably, the pigment is present in an amount of from about 30 to about 60 wt %, based on the total weight of the composition. Examples of suitable pigments include those recognized by those of ordinary skill in the art of surface coatings. For example, the pigment may be a typical organic or inorganic pigment, especially those set forth by the Colour Index, 3d Ed., 2d Rev., 1982, published by the Society of Dyers and Colourists in association with the American Association of Textile Chemists and Colorists, incorporated by reference herein. Other examples of suitable pigments include, but are not limited to, titanium dioxide, barytes, clay, calcium carbonate, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1 and CI Pigment Red 57:1. Preferably, the pigment is titanium oxide. Colorants such as, for example, phthalocyanine blue, molybdate orange, or carbon black, may be also be added to the ambient cure oxidative cure enamel composition.

A waterborne acrylate-functionalized alkyd coating composition of the invention may further contain at least one coating additive known in the art. Examples of suitable coating additives include, but are not limited to, leveling and flow control agents, such as silicones, fluorocarbons or cellulosics, extenders, plasticizers, flatting agents, pigment wetting and dispersing agents, ultraviolet (UV) absorbers, UV light stabilizers, defoaming and antifoaming agents, anti-settling, anti-sag, and bodying agents; anti-skinning agents, anti-flooding and anti-floating agents, and corrosion inhibitors. Specific examples of such additives can be found in Raw Materials Index, published by the National Paint & Coatings Association, 1500 R.I. Avenue, N.W., Washington, D.C. 20005, which document is incorporated herein by reference. Further examples of such additives may be found in U.S. Pat. No. 5,371,148, which is likewise incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; and synthetic silicate, available from J. M. Huber Corporation, as ZEOLEX®.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK® of Buckman Laboratories Inc.; BYK® of BYK Chemie, U.S.A.; FOAMASTER® and NOPCO® of Henkel Corp./ Coating Chemicals; DREWPLUS® of the Drew Industrial Division of Ashland Chemical Company; TRYSOL® and TROYKYD® of Troy Chemical Corporation; and SAG® of Union Carbide Corporation.

Examples of U.V. absorbers and U.V. light stabilizers include, but are not limited to, substituted benzophenone, substituted benzotriazoles, hindered amines, and hindered benzoates, available from American Cyanamid Company as CYASORB UV®, and diethyl-3-acetyl4-hydroxy-benzyl-phosphonate, 4-dodecyloxy-2-hydroxy benzophenone, and resorcinol monobenzoate.

The waterborne acrylate-functionalized alkyd composition may contain from 0 to about 30 wt %, or from 0 to about 10 wt %, based on the total weight of the composition, of an organic solvent. Preferred organic solvents are water miscible and include, but are not limited to, ethanol, n-propanol, isopropanol, n-butanol, sec-butanol, isobutanol, ethylene glycol, monobutyl ether, propylene glycol n-butyl ether, propylene glycol methyl ether, propylene glycol monopropyl ether, dipropylene glycol methyl ether, and diethylene glycol monobutyl ether.

The invention also provides a method of preparing a waterborne acrylate-functionalized alkyd coating composition comprising the step of combining an acrylate-functionalized alkyd resin with at least one drier, in the presence of water, each as described above. An acrylate-functionalized alkyd resin may be prepared as described above. Preferably, the acrylate-functionalized alkyd resin is reacted with at least one drier, present in an amount of about 0.01–1.0 wt % in water.

The following examples are given to illustrate the invention. It should be understood, however, that the invention is not to be limited to the specific conditions or details described in these examples.

The examples of various coating compositions of the invention use the following materials not described above:

PAMOLYN 200, a tall oil fatty acid, sold by Eastman Chemical Co. of Kingsport, Tenn.

FASCAT 4100 and FASCAT 4350, esterification catalysts, sold by M&T Chemicals of Rahway, N.J.

Silwet L-77, a polyalkyleneoxide modified heptamethyltrisiloxane, sold by OSI Specialities of Danbury, Conn.

Zirconium HYDRO-CEM, a zirconium carboxylate, sold by OMG Americas of Westlake, Ohio.

Cobalt HYDRO-CURE II, a cobalt carboxylate, sold by OMG Americas of Westlake, Ohio.

SCS 4682, SCS 4683, SCS 4712, and Atlas G-3300B, non-migratory surfactants, provided by Uniqema of New Castle, Del.

The following method was used to evaluate the coatings and films prepared according to the invention.

Through-Dry Thumb Test: The coating is considered "through-dry" if it is not affected (no wrinkling) by pressing and twisting with the thumb on the surface of the film.

EXAMPLES

Example 1

Preparation of Waterborne Alkyd Resin 1

An NPG/SIP adduct was first prepared by reacting neopentyl glycol (NPG) (827 g, 7.95 mol), 5-sodiosulfoisophthalic acid (SIP) (536 g, 2.00 mol), water (91.9 g), and the acid catalyst FASCAT 4100 (1.10 g), in a three-neck, round-bottom flask equipped with a mechanical stirrer, a steam-jacketed partial condenser, a Dean-Stark trap, a nitrogen inlet, and a water condenser. The reaction temperature was gradually increased from 110–150° C. in a 45-min period, and the distillate collected in the Dean-Stark trap. The reaction was allowed to continue at 150–180° C. for 3 hr and at 190° C. for 4.5 hr, until an acid number of 3.0 mg KOH/g was obtained. A portion of the resultant product was used in the following step.

In a separate reactor equipped with the same configuration as above were charged neopentyl glycol (NPG) (48.4 g, 0.47 mol), the above NPG/SIP adduct (148 g), pentaerythritol (PE) (42.9 g, 0.32 mol), isophthalic acid (IPA) (97.2 g, 0.59 mol), and FASCAT 4100 (0.34 g). The mixture was allowed to react at 170–190° C. until 16.0 g of the condensate (water) was obtained. After the mixture was cooled, PAMOLYN 200 (Eastman) (423 g, 1.46 mol) was then added. The reaction was allowed to continue at 170–220° C. until an acid number of 9.1 mg KOH/g was obtained. The resulting resin was allowed to cool and subsequently collected.

Example 2

Preparation of Acrylate-Functionalized Alkyd Resin 1

To a three-neck, round-bottom flask equipped with a mechanical stirrer, a water condenser, and a nitrogen inlet, were charged the waterborne functional alkyd resin 1 of Example 1 (201 g, 70%) and phthalic anhydride (PA) (10.6 g, 0.07 mol). The reaction mixture was stirred at 150–160° C. for 2 hr, and then allowed to cool to 110° C. Glycidyl methacrylate (GMA) (15.2 g, 0.11 mol) was subsequently added. The reaction was allowed to continue at 150° C. for two hours to yield a resin with an acid number of 2.2.

Example 3

Coating Formulations

A coating formulation was prepared by mixing the acrylate-modified alkyd resin 1 (10.0 g) prepared from Example 2 with water (14.6 g), a drier blend (0.34 g), and Silwet L-77 (OSI Specialities) (0.06 g). A control formulation was also prepared using the unmodified resin from Example 1. The drier blend was prepared by mixing Zirconium HYDRO-CEM (12%, OMG Americas) (26.9 g), Cobalt HYDRO-CURE II (OMG Americas) (13.1 g), and ethylene glycol monobutyl ether (EB) (10.0 g).

Example 4

Film Dry Time

The coating formulations from Example 3 were drawn down on Leneta chart (3 mil wet thickness) and allowed to dry in air at room temperature. The results of the Through-Dry Thumb test are listed in the table below:

|  | Through-Dry Time (hr) |
| --- | --- |
| Unmodified Alkyd 1 | >7 days |
| Acrylate Alkyd 1 | 18 hr* |

*Film surface remained slightly tacky

Example 5

Preparation of Alkyd Resin 2

To a three-neck, round-bottom flask equipped with a mechanical stirrer, a steam-jacketed partial condenser, a Dean-Stark trap, a nitrogen inlet, and a water condenser, were charged pentaerythritol (PE) (425 g), trimethylolpropane (TMP) (174 g), soybean oil (2351 g), and FASCAT 4350 (0.39 g). The mixture was allowed to react at 238° C. for five hours in this alcoholysis step. To the mixture were then added isophthalic acid (IPA) (950 g) and the refluxing solvent, methyl isobutyl ketone (MIBK) (97.5 g). The reaction was allowed to continue at 238° C. until 203 mL of the condensate (water) was obtained. The acid number was determined to be 8.6 mg KOH/g. The resulting resin was allowed to cool and isolated. It had a number average molecular weight (Mn) of 2,500, and a weight average molecular weight (Mw) of 200,000.

Example 6

Preparation of Acrylate-Functionalized Alkyd Resin 2

To a three-neck, round-bottom flask equipped with a mechanical stirrer, a water condenser, and a nitrogen inlet, were charged the alkyd resin 2 of Example 5 (211 g) and phthalic anhydride (PA) (10.3 g, 0.07 mol). The reaction mixture was stirred at 150–160° C. for 1.5 hr, and then allowed to cool to 110° C. Glycidyl methacrylate (GMA) (16.7 g, 0.12 mol) was subsequently added. The reaction was allowed to continue at 150–160° C. for 2.5 hr to yield a clear resin with an acid number of 2.0.

Example 7

Emulsification of Acrylate-Functionalized Alkyd Resin

The acrylate-functionalized alkyd resin 2 as prepared in Example 6 (500 g) was placed in a two-quart stainless steel beaker, followed by the Uniqema surfactants SCS 4682 (3.3 g), SCS 4683 (24.4 g), and SCS 4712 (3.3 g), and Atlas G-3300B. The mixture was brought to 50° C. under gentle agitation with a 2" Cowles blade. Once the proper temperature was reached, the addition of water (441 g), heated to 60° C., was started via an FMI pump. As the addition of water proceeded, the speed of the Cowles blade was gradually increased to 2000 rpm. Once the inversion of the emulsion was confirmed, the speed of the blade was reduced and the remaining water was added to the emulsion.

It should be understood that the foregoing discussion and examples merely present a detailed description of certain preferred embodiments. It will be apparent to those of ordinary skill in the art that various modifications and equivalents can be made without departing from the spirit and scope of the invention. All the patents, journal articles and other documents discussed or cited above are herein incorporated by reference.

We claim:

1. A waterborne acrylate-functionalized alkyd coating composition, comprising:
    (I) an acrylate-functionalized alkyd resin comprising the reaction product of:
        (a) about 79 to about 95 wt % of an alkyd resin having an acid number of from 0 to about 100 mg KOH/g;
        (b) about 2 to about 8 wt % of an acid anhydride; and
        (c) about 3 to about 13 wt % of a glycidyl acrylate, wherein the glycidyl moiety of the glycidyl acrylate is the reactive moiety and the reaction product contains reactive acrylate moieties, and
        wherein the weight percents are based on the total weight of (a), (b) and (c);
    (II) at least one drier; and
    (III) water.

2. The waterborne acrylate-functionalized alkyd coating composition of claim 1, wherein the alkyd resin of (I)(a) comprises the reaction product of:
    (i) 0 to about 30 mol % of a diol;
    (ii) about 10 to about 40 mol % of a polyol;
    (iii) about 20 to about 40 mol % of a polyacid;
    (iv) 0 to about 10 mol % of a monofunctional acid; and
    (v) about 10 to about 50 mol % of a fatty acid, fatty ester or naturally occurring oil,
wherein the mole percents are based on the total moles of (i), (ii), (iii), (iv) and (v).

3. The waterborne acrylate-functionalized alkyd coating composition of claim 1, wherein the glycidyl acrylate is glycidyl methacrylate.

4. The waterborne acrylate-functionalized alkyd coating composition of claim 1, wherein the alkyd resin has a hydroxyl number from about 30 to about 180 mg KOH/g.

5. The waterborne acrylate-functionalized alkyd coating composition of claim 2, wherein the alkyd resin of (I)(a)

further comprises from about 2 to about 10 mol % of a sulfomonomer.

6. The waterborne acrylate-functionalized alkyd coating composition of claim 2, wherein the diol is neopentyl glycol, the polyol is trimethylolpropane or pentaerythritol, the polyacid is isophthalic acid or phthalic anhydride, and the naturally occurring oil or fatty acid is soybean oil or tall oil fatty acid.

7. The waterborne acrylate-functionalized alkyd coating composition of claim 5, wherein the sulfomonomer comprises 5-sodiosulfoisophthalic acid.

8. The waterborne acrylate-functionalized alkyd coating composition of claim 1, wherein:
the acrylate-functionalized alkyd resin is present in an amount of from about 30 to about 60 wt %, based on the total composition;
the drier is present in an amount of from about 0.01 to about 1.0 wt %, based on the total composition; and
the water is present in about 40 to about 70 wt %, based on the total composition.

9. The waterborne acrylate-functionalized alkyd coating composition of claim 1, wherein the drier comprises at least one member selected from the group consisting of a cobalt salt, a zirconium salt, a calcium salt, a zinc salt, and a manganese salt.

10. The waterborne acrylate-functionalized alkyd coating composition of claim 1, further comprising an amine.

11. The waterborne acrylate-functionalized alkyd coating composition of claim 1, further comprising a surfactant.

12. The waterborne acrylate-functionalized alkyd coating composition of claim 1, further comprising from greater than 0 to about 30 wt %, based on the total composition, of an organic solvent.

13. The waterborne acrylate-functionalized alkyd coating composition of claim 1, further comprising at least one member selected from the group consisting of a flow control agent, an extender, a plasticizer, a flatting agent, a pigment wetting agent, a pigment dispersing agent, an ultraviolet (UV) absorber, a UV light stabilizer, a tinting pigment, a colorant, a defoaming agent, an antifoaming agent, an anti-settling agent, an anti-sag agent, a bodying agent, an anti-skinning agent, an anti-flooding agent, an anti-floating agent, and a corrosion inhibitor.

14. A method of making a waterborne acrylate-functionalized alkyd coating composition, comprising a step of combining:
(I) an acrylate-functionalized alkyd resin comprising the reaction product of
  (a) a hydroxyl functional alkyd resin with an acid number of 0 to about 100 mg KOH/g,
  (b) an acid anhydride, and
  (c) a glycidyl acrylate,
  wherein the glycidyl moiety of the glycidyl acrylate is the reactive moiety and the reaction product contains reactive acrylate moieties;
(II) at least one drier; and
(III) water.

15. The method according to claim 14, wherein:
the acrylate-functionalized alkyd resin is present in an amount of from about 30 to about 60 wt %, based on the total composition;
the drier is present in an amount of from about 0.01 to about 1.0 wt %, based on the total composition; and
the water is present in an amount of from about 40 to about 70 wt %, based on the total composition.

16. The method of claim 15, further comprising a step of adding a surfactant.

17. A method of making a waterborne acrylate-functionalized alkyd coating composition, comprising the steps of:
(a) reacting:
  (i) from 0 to about 30 mol % of a diol,
  (ii) from about 10 to about 40 mol % of a polyol,
  (iii) from about 20 to about 40 mol % of a polyacid,
  (iv) from 0 to about 10 mol % of a monofunctional acid, and
  (v) from about 10 to about 50 mol % of a fatty acid, a fatty ester, or a naturally occurring, partially-saponified oil,
  in the presence of a catalyst, each as described above, at about 180–250° C., until the desired amount of the condensate is obtained, to form an alkyd resin, wherein the mole percents are based on the total moles of (i), (ii), (iii), (iv), (v) and (vi);
(b) reacting, at a temperature range of about 150–165° C., the alkyd resin of step (a) with from about 2 to about 8 wt % of an acid anhydride, to form a carboxyl-functional alkyd resin; and
(c) reacting, at a temperature range of from about 125–155° C., the carboxyl-functional alkyd resin of step (b) with from about 3 to about 12 wt % of a glycidyl acrylate, to form an acrylate-functionalized alkyd resin,
wherein the weight percents are based on the total weight of the alkyd resin, the acid anhydride and the glycidcyl acrylate.

18. A substrate coated with the waterborne acrylate-functionalized alkyd coating composition of claim 1.

19. A substrate coated with the waterborne acrylate-functionalized alkyd coating composition of claim 8.

20. A substrate coated with a waterborne acrylate-functionalized alkyd coating composition of claim 12.

21. A method of making an emulsion of the acrylate-functionalized alkyd resin of claim 1, comprising a step of combining the acrylate-functionalized alkyd resin with at least one surfactant, in the presence of water.

* * * * *